May 26, 1925.  1,539,139

J. A. O'CONNOR

MOTOR CYCLE SIDE CAR

Filed Jan. 28, 1924

Inventor:
James Alexander O'Connor
By
Attorney.

Patented May 26, 1925.

1,539,139

UNITED STATES PATENT OFFICE.

JAMES ALEXANDER O'CONNOR, OF ESSENDON, MELBOURNE, VICTORIA, AUSTRALIA.

MOTOR-CYCLE SIDE CAR.

Application filed January 28, 1924. Serial No. 689,086.

*To all whom it may concern:*

Be it known that I, JAMES ALEXANDER O'CONNOR, a subject of the King of Great Britain and Ireland, residing at Pascoe Crescent, North Essendon, in the city of Essendon, a suburb of the city of Melbourne, in the State of Victoria, Commonwealth of Australia, have invented certain new and useful Improvements in Motor-Cycle Side Cars, of which the following is a specification.

The object of this invention is to provide an improved motor cycle side car of simple construction by which wear upon the tires of the motor cycle and side car wheels is minimized and other advantages are obtained which will become more clearly apparent from the following description to those skilled in the art. The scope of the invention is defined in the appended claims.

Referring to the drawings wherein the manner of carrying the invention into practical effect is shown:—

Figure 1 is a rear perspective view of the invention. Portions have been broken away and the axle of the side car wheel has been omitted for convenience of illustration.

Figure 1ª is a perspective view showing the axial mounting of the side car wheel.

Figure 1:
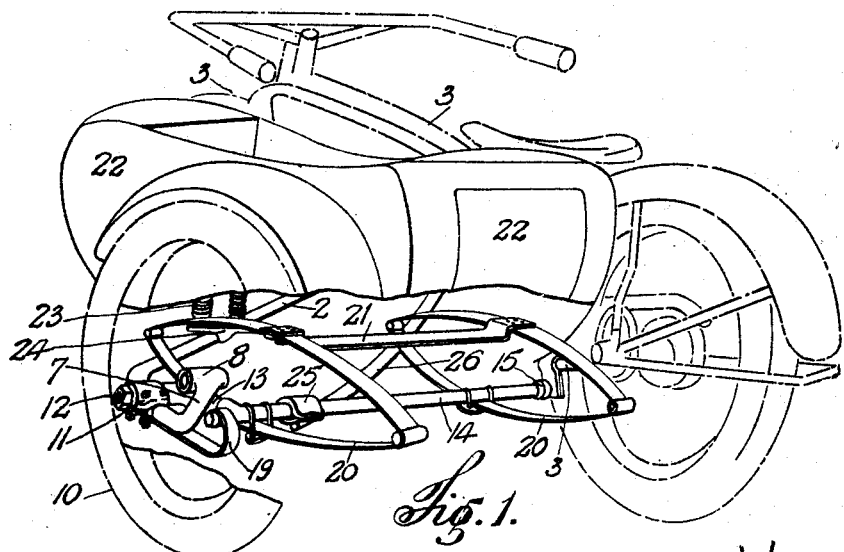
Figures 1A, 2:
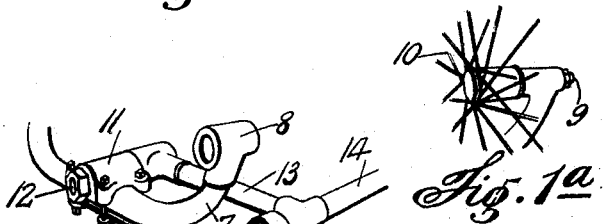
Figure 2 is a perspective view of pivotally arranged parts adapted to provide for comparative vertical movement of the side car wheel.
Figure 4:
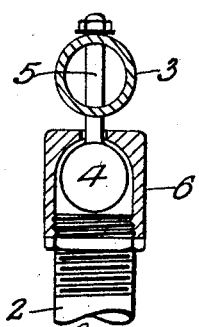
Figure 4 is an enlarged sectional plan of a ball joint connection by which a frame member is attached to the motor cycle frame.

The invention includes an approximately diagonal frame member 2 pivotally connected at its forward end to the motor cycle frame 3. The connection is made behind the front wheel of the motor cycle as is usual. The connection preferably comprises a ball 4 having a stem 5. The stem 5 passes through the motor cycle frame 3. The ball is located in a casing 6 into which the forward end of the member 2 is threaded, as seen in Figure 4. The rear end of the member 2 is upraised as at 7 and located parallel with the motor cycle frame. Carried by the upraised end 7 is a bearing 8 in which is removably disposed the axle 9 of the side car wheel 10. Removable axles are commonly used and any suitable kind may be employed. Carried by the member 2 adjacent to the end 7 is a bearing 11 in which is mounted a pin 12. The inner end of the pin 12 projects beyond the bearing. Pivoted to the projecting end of the pin 12 is the forward end of an arm 13 the rear end of which is attached to the outer end of a lateral bar 14. The inner end of the bar 14 has threaded thereon a casing 15 in which a ball 16 is located, see Figure 5. Projecting from the ball 16 and passing through the casing 15 is a stem 17 connected to the motor cycle frame 3 by any known form of clamp, such as that shown at 18.

Secured to the frame member 2, beneath the upraised rear end 7 thereof, is the forward end of a spring 19 the rear end of which is secured to the outer end of the lateral bar 14. Mounted upon the lateral bar 14 are two elliptical springs 20 united by a tie piece 21 upon which the rear end of the side car body 22 is supported. The forward end of the body 22 is supported by coiled springs 23 mounted upon a platform 24 carried by the member 2.

Figures 6, 7:
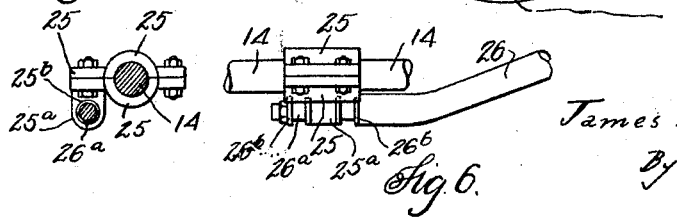
Figure 6 is a detailed view, in side elevation, of the pivotal connection for the lower end of the diagonal stay or brace.
Figure 7 is an end view, partly in section, of Figure 6.

Mounted upon the lateral bar 14 is a clamp or bearing 25 consisting of two pieces bolted together as shown in Figs. 6 and 7. Depending from this clamp is a lug 25ª formed with a transverse hole 25ᵇ through which loosely passes the lower reduced end 26ª of a diagonal brace or stay 26. Spring washers 26ᵇ or the like may be located at each side of the lug 25ª to prevent undue slackness while permitting a slight movement of the lower end 26ª of the stay 26 through the hole 25ᵇ in the lug 25 when the lateral bar 14 (and with it the clamp 25) slightly rotates. Any other suitable coupling may be used in lieu of the clamp 25.

Figure 5:
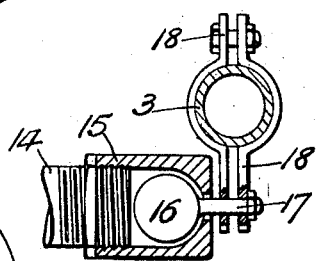
Figure 5 is an enlarged sectional end elevation of a ball joint connection by which a lateral bar is attached to the motor cycle frame.

The upper end of the stay 26 is pivotally connected to the motor cycle frame near the saddle by a ball joint coupling. This is the same as that for the diagonal member 2. Most motor cycles are provided with a lug or hole near the saddle to pass the stem 5 of such a coupling; but should no hole be provided in the motor cycle frame, the coupling may obviously be attached by a clamp such as that indicated at 18 (Fig. 5). It is common practice in side car construction to employ diagonal braces having pivotal connections at the upper or lower ends thereof or at both ends. In the present instance, any possibility of binding of the several parts should be avoided by making provision for movement of the lower end of the brace in relation to the clamp 25 when the bar 14 slightly rotates and also when the bar 14 is slightly deflected by movement of the arm 13.

Figure 3:
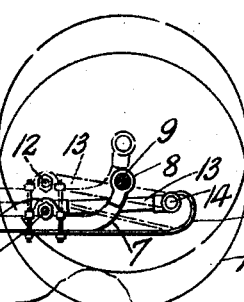
Figure 3 is side elevation showing the movement of pivotal parts when the side car wheel passes over an obstruction.

When the side car wheel 10 rises, the rear end 7 of the frame member 2 also rises and pivots at its forward end at the ball connection 4—6 by which it is secured near the front of the motor cycle frame 3. The bearing 11 rises with the end 7, thereby lifting the forward end of the arm 13, as shown in broken lines in Figure 3. The arm 13 pivots upon the pin 12, and as it rises it slightly rotates the lateral bar 14. The slight rolling action of the bar 14 reduces the effect of any shocks that may reach the passenger. The spring 19 functions as a shock absorber. This is clearly seen from Figure 3. The arrangement of the several parts is such that the distance between the side car wheel and the rear wheel of the motor cycle is evenly maintained avoiding spread in the track of the wheels and minimizing wear of the tires. The bar 14 is prevented from rising and falling by the diagonal brace 26. Adjustment of the side car in relation to the motor cycle frame may be accurately effected by threading the casings 6 and 15 along the bars 2 and 14 respectively and sliding the clamp 25 along the bar 14.

What I claim is:—

1. In a motor cycle side car, a frame member pivotally connected at its forward end to the motor cycle frame adjacent to the front wheel of the motor cycle and extending to and carrying at its rear end the side car wheel so that said member acts as a long lever when the wheel moves vertically, an arm pivoted to the frame member, a lateral bar connected to the arm, a shock absorber connected to the frame member, and the lateral bar, and a side car body resiliently mounted upon the lateral bar.

2. In a motor cycle side car, a frame member forming a long lever, a lateral bar pivotally connected to the frame member, a side car body resiliently supported by the lateral bar, and a shock absorber disposed between the frame member and the bar, so that, when the shock absorber is operated, a slight rolling motion is communicated to the bar.

3. In a motor cycle side car, a side car wheel capable of rising and falling when passing over road inequalities, a lateral bar capable of slight rotary movement and attached at its inner end to the motor cycle frame, a diagonal brace disposed between said bar and the motor cycle frame, a side car body resiliently supported above the bar, a shock absorber operated by vertical movement of the side car wheel, and means for causing a slight rolling motion of the bar when the shock absorber is operated.

4. A motor cycle side car comprising a frame member pivotally connected at its forward end at the front of the motor cycle frame, a side car wheel removably mounted at the rear end of the frame member, an arm pivoted to the frame member forward of the wheel axle, a lateral bar pivotally connected at its inner end to the motor cycle frame and connected at its outer end to the rear end of the arm, a spring attached to the frame member and the lateral bar, and springs carried by the frame member and the lateral bar to support the side car body.

In testimony whereof, I have signed my name to this specification at Melbourne, State of Victoria, Commonwealth of Australia in the presence of two subscribing witnesses.

Dated this 18th day of December A. D. 1923.

JAMES ALEXANDER O'CONNOR.

Witnesses:
  G. A. UKEN,
  V. J. CLEARY.